(12) United States Patent
Blyumen

(10) Patent No.: US 10,430,055 B2
(45) Date of Patent: Oct. 1, 2019

(54) MULTI-TOUCH INTERFACE AND METHOD FOR DATA VISUALIZATION

(71) Applicant: Oracle International Corporation, Redwood Shores, CA (US)

(72) Inventor: Julia Blyumen, Scotts Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 520 days.

(21) Appl. No.: 14/840,283

(22) Filed: Aug. 31, 2015

(65) Prior Publication Data
US 2015/0370471 A1 Dec. 24, 2015

Related U.S. Application Data

(63) Continuation of application No. 13/689,515, filed on Nov. 29, 2012, now Pat. No. 9,158,766.

(51) Int. Cl.
*G06F 3/0484* (2013.01)
*G06F 16/00* (2019.01)
*G06F 3/0488* (2013.01)
*G06F 11/30* (2006.01)

(52) U.S. Cl.
CPC ...... *G06F 3/04847* (2013.01); *G06F 3/04883* (2013.01); *G06F 11/3089* (2013.01); *G06F 16/00* (2019.01); *G06F 2203/04808* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,720,552 B1 * | 5/2010 | Lloyd | ................. | G05B 19/106 700/10 |
| 8,527,909 B1 * | 9/2013 | Mullany | ............... | G06F 3/0484 345/173 |
| 9,202,297 B1 * | 12/2015 | Winters | ................ | G06T 11/206 |

(Continued)

OTHER PUBLICATIONS

Oracle Fusion Middleware User's Guide for Oracle Business Intelligence; 11g Release 1 (11.1.1) Copyright 2010; 32 pages.
Tableau Online Help; Version 7.0.7; Copyright Jul. 27, 2012; 1 page.
IOS Human Interface Guidelines; Apple Copyright 2012; 203 pages.
Raden, Neil; "Business Intelligence 2.0: Simpler, More Accessible, Inevitable"; Feb. 1, 2007; 5 pages.

(Continued)

*Primary Examiner* — Doon Y Chow
*Assistant Examiner* — James T Tsai
(74) *Attorney, Agent, or Firm* — Trellis IP Law Group, PC

(57) ABSTRACT

A system and method for facilitating adjusting a displayed representation of a visualization. An example method includes employing a touch-sensitive display to present a user interface display screen depicting a first visualization; and providing a first user option to apply touch input to a region of the user interface display screen coinciding with a portion of the first visualization to facilitate affecting an arrangement of data displayed via the first visualization, wherein the touch input includes a multi-touch gesture. In a more specific embodiment, the touch gesture includes a rotation gesture, and the method further includes displaying a visual indication of a change, e.g., a pivot operation, to be applied to a second visualization as a user performs the rotation gesture, and updating the second visualization as a user continues perform the rotation gesture. The first visualization is updated based on the second visualization upon completion of the rotation gesture.

18 Claims, 13 Drawing Sheets

(56) References Cited

U.S. PATENT DOCUMENTS

| | | | | |
|---|---|---|---|---|
| 2002/0116417 | A1* | 8/2002 | Weinberg | G06F 17/243 715/212 |
| 2012/0030611 | A1* | 2/2012 | Skidmore | A61M 16/0051 715/777 |
| 2012/0215804 | A1* | 8/2012 | Christensen | G06F 17/246 707/769 |
| 2012/0254783 | A1* | 10/2012 | Pourshahid | G06F 3/04883 715/771 |
| 2012/0311508 | A1* | 12/2012 | Fleizach | G06F 3/0488 715/863 |
| 2012/0327121 | A1* | 12/2012 | Dhawade | G06F 3/04883 345/649 |
| 2013/0097177 | A1* | 4/2013 | Fan | G06F 17/30554 707/748 |
| 2014/0078066 | A1* | 3/2014 | Locker | G06F 3/04883 345/173 |
| 2014/0098020 | A1* | 4/2014 | Koshi | G06F 3/0488 345/156 |

OTHER PUBLICATIONS

Raden, Neil; "Tableau—Fast Analytics and Business Intelligence for Everyone: best practices for deploying collaborative bi"; May 4, 2008; 18 pages.

Mobile Tablet PCs, Not Phones, Will Create Critical Mass for Enterprise BI Adoption; Mar. 3, 2011; 2 pages.

Oracle Fusion Middleware Mobile Browser Developer's Guide for Oracle Application Development Framework; 11g Release 1 (11.1.1); Copyright 2010; 11 pages.

Oracle Fusion Middleware Web User Interface Developer's Guide for Oracle Application Development Framework; 11g Release 1 (11.1.1); Copyright 2010; 1 page.

Oracle Fusion Middleware Web User Interface Developer's Guide for Oracle Application Development Framework; 11g Release 1 (11.1.1); Copyright 2010; 17 pages.

* cited by examiner

View ~134

Income
Net Income
Spending
Average Spending
Net Worth
Budgeted Spending
Assets
Debt

View By ~138

Year
Quarter
Month
Day
Category
Payee
Account
Asset Type

140

146

| Year | 2006 | 2007 | 2008 | 2009 | 2010 |
|---|---|---|---|---|---|
| Income | $2750 | $3750 | $4750 | $5750 | $6750 |
| Spending | $1789 | $2789 | $3789 | $4789 | $5789 |
| Net | $961 | $961 | $961 | $961 | $961 |

MULTI-TOUCH INTERFACE AND METHOD FOR DATA VISUALIZATION

CROSS REFERENCES TO RELATED APPLICATIONS

This application is a continuation of and claims priority to U.S. patent application Ser. No. 13/689,515, entitled MULTI-TOUCH INTERFACE FOR VISUAL ANALYTICS, filed on Nov. 29, 2012, which is hereby incorporated by reference, as if set forth in full in this specification for all purposes.

BACKGROUND

The present application relates to software and more specifically to user interface designs and methods for facilitating manipulating information visualizations, such as tables, charts, graphs, tree diagrams, and so on.

A visualization may be any visual depiction or graphical arrangement of data and/or calculations based on data. Visualizations that include calculation results or measurements are called analytics herein. Visualizations are employed in various demanding applications, including business, science, and economics, for facilitating analyzing data and accompanying calculations to perform financial analysis, scientific inquiry, market forecasts, and so on. Such applications demand efficient mechanisms for enabling users to manipulate visualizations without losing focus on the visualization or analysis being performed.

Efficient mechanisms for manipulating visualizations are particularly important in analytic software employed by enterprises, where effective analysis of data can affect corporate profitability, goal attainment, and so on. Such analytic software may use data from business operations to enhance awareness and improve decision making. Organizations that successfully leverage their data assets for decision-making may gain a competitive advantage.

Conventionally, analytics software used to present visualizations employs various menu items, buttons, and other Graphical User Interface (GUI) controls to facilitate selecting underlying data, performing calculations or operations on underlying data, and for manipulating visualizations. Example visualization manipulations include pivoting, zooming, filtering of data, drilling into data (i.e., illustrating more detail), adding or removing dimensions and measures from a visualization, and so on. However, use of separate menus, buttons, and so on, may distract a user from the analytic, which may complicate analysis.

Alternatively, certain mechanisms for manipulating visualizations are embedded in the visualization itself. However, such mechanisms remain relatively inefficient and incomplete, and they may still require users to navigate complicated menus to select desired options. Such inefficiencies may further inhibit adoption of analytic software among enterprises.

SUMMARY

An example method for facilitating adjusting a displayed representation of a visualization, such as a table, diagram, graph, or other analytic, includes employing a touch-sensitive display to present a user interface display screen depicting a first visualization; and providing a first user option to apply touch input to a region of the user interface display screen coinciding with a portion of the first visualization to facilitate affecting an arrangement of data displayed via the first visualization, wherein the touch input includes a multi-touch gesture.

In a more specific embodiment, the multi-touch gesture includes a rotation gesture, and the method further includes displaying a visual indication, via a second visualization, of a change to be applied to the first visualization as a user performs the rotation gesture, and updating or changing the second visualization as a user continues perform the rotation gesture. The method further includes implementing a change in the first visualization upon completion of the rotation gesture, where the change in the first visualization corresponds to a change illustrated via the second visualization. In the specific example embodiment, the first visualization includes a table, and the second visualization illustrates one or more options for changing an arrangement of columns or rows of the first visualization, i.e., an option to apply a pivot operation, to the table as indicated by the second visualization.

In an illustrative embodiment, the example method further includes providing a first user option to employ a pinch gesture to implement a drilling operation on data represented via the first visualization. The first user option includes an option to employ a pinch together gesture, also called a pinch close gesture, to implement a logical zoom out of data represented via the first visualization in response to the pinch gesture. A pinch apart gesture, also called a pinch open gesture, is used to implement a logical zoom in, i.e., a drilling operation on data presented via the first visualization.

The touch input may further include a first sequence of gestures for implementing a filtering operation on data displayed via the first visualization. An example sequence of gestures includes a press and drag gesture, also simply called a drag gesture, that is adapted to cause selection of a portion of the first visualization; a press and hold gesture applied to a selected portion of the first visualization, resulting in display of a user interface control in response thereto; followed by a tap gesture to select the user interface control that appears in response to the press and hold gesture, thereby resulting in filtering of the first visualization. An example filtering operation includes removal of a portion of the first visualization that was selected via the dragging gesture.

The example method further includes providing a second user option to add a dimension to the first visualization by selecting a dimension from a list by pressing on a representation of the dimension and employing a press and drag gesture to move the dimension into a position on the first visualization. A third user option enables removal of a dimension from a visualization by selecting a visual representation of a dimension in or on the first visualization via a press gesture, followed by a drag gesture, where the drag gesture terminates at a region of the user interface display screen that is off of the displayed visualization.

Hence, certain embodiments discussed herein may provide a suite or collection of touch input gestures, including multi-touch gestures, which are mapped to visualization-specific operations, such as pivoting, drilling, filtering, adding dimensions, and removing dimensions from a visualization, such as an analytic. Users may apply intuitive touch input to the surface of a touch-sensitive display corresponding to a visualization to manipulate the visualization, thereby obviating the need to navigate complex Graphical User Interface (GUI) menus that are separate from the visualization, and thereby enabling a user to maintain focus on the visualization and analysis being performed.

Accordingly, certain embodiments discussed herein may obviate use of a cursor, mouse, and conventional GUI controls for analytic manipulations, while providing enhanced multi-touch interface functionality for visual analytics, thereby improving usability of accompanying analytic applications and increasing user productivity. Substantial enhancements to user experience relative to conventional analytic applications may increase adoption rates of accompanying analytic software, thereby further enhancing enterprise productivity.

A further understanding of the nature and the advantages of particular embodiments disclosed herein may be realized by reference of the remaining portions of the specification and the attached drawings.

BRIEF DESCRIPTION OF THE DRAWINGS

FIG. 4B illustrates a tenth example user interface display screen after a user has further dragged a dimension into position via the press and drag gesture began in FIG. 4A.

DETAILED DESCRIPTION OF EMBODIMENTS

For the purposes of the present discussion, touch input may be any input, such as input via a gesture, provided to a computing device via a touch-sensitive display. A touch-sensitive display, also called a touch screen, may be any display mechanism, including hardware, electronics, and underlying software that includes a touch-sensitive surface that is responsive to touch input from a user. A touch-sensitive display may be touched with one or more fingers and/or other objects or devices, such as a stylus.

Generally, a gesture may be any movement that involves motion to trigger a signal to control or otherwise affect a user interface display screen. A gesture may include motion across a display, a tap at a predetermined position or any position of the display, etc.

Specifically, a touch gesture may be any gesture used to provide touch input to a touch-sensitive display, which may then affect content presented via a user interface display screen. Certain touch gestures may include touching the display and moving fingers or other devices in certain patterns across the display or across certain portions of the display to trigger different user interface input signals.

A multi-touch gesture may be any gesture that involves contacting a touch-sensitive display simultaneously at different positions on the display. Multi-touch input may involve use of multiple fingers applied to a surface of a touch-sensitive display. Examples of multi-touch input include a two-finger swiping motion, two-finger tap, two-finger tap and hold, two finger rotate (also simply called a rotation gesture), and so on.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
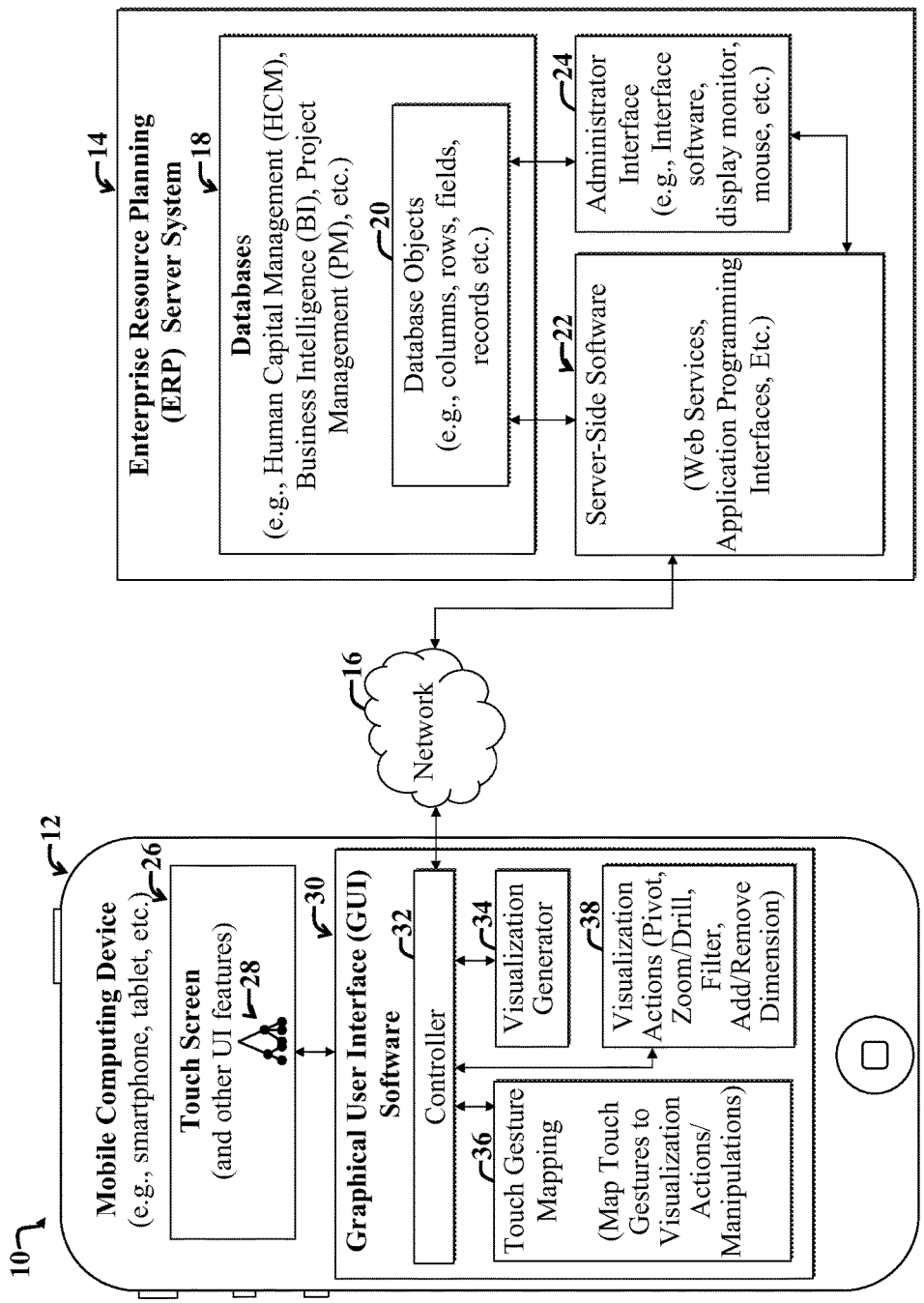
FIG. 1 is a diagram illustrating an example computing environment and accompanying system for employing context-sensitive touch gestures to control or manipulate visualizations via a touch-sensitive display.

FIG. 1 is a diagram illustrating an example computing environment and accompanying system 10 for employing context-sensitive touch gestures to control or manipulate visualizations via a touch-sensitive display 26. The example system 10 includes a mobile computing device 12, such as a smartphone, tablet, or other computer, in communication with an Enterprise Resource Planning (ERP) server system 14 via a network 16, such as the Internet. The ERP server 14 includes various databases 18, which store database objects 20

For the purposes of the present discussion, an object, such as a data object, may be any grouping of or encapsulation of data and/or functionality. Examples of objects include classes or structures implemented via object-oriented programming languages; tables, rows, or records of a database; and so on. A representation of an object, i.e., a displayed object, may be displayed via graphical depiction, such as a row, column, or field of a table, a node of a tree diagram, a menu item, dialog box, personnel icon, and so on. The graphical depiction of an object may also be called an object, a displayed object, an element, or a node.

A visualization that depicts data that includes calculation results, such as metrics, is called an analytic. A metric may be any measurement, parameter, or other indicator associated with a person or thing. Examples of metrics include sales performance scores or quota attainment numbers, versatility measurements, and so on.

Server-side software 22, such as web services, Application Programming Interfaces (APIs), and so on, may communicate with the database objects 20 to selectively employ data thereby, such as to facilitate implementation of various software applications, which may include server-side and client-side applications. Generally, server-side implementations involve running applications on the ERP server 14 in response to a request from a client, such as the mobile computing device 12. The server-side application may then send data and/or instructions back to the client device 12. In client-side implementations, software may be downloaded to the mobile computing device 12 and then executed locally on the device 12.

The example ERP server system 14 includes an administrator user interface 24, which may include hardware and software functionality for enabling an administrator to make changes to various components of the ERP server system 14, such a settings, installed software, and so on.

The mobile computing device 12 represents an example client device that communicates with server-side software 22. Note that client devices other than mobile computing devices may be employed without departing from the scope of the present teachings.

The mobile computing device 12 employs a touch screen 26 in communication with Graphical User Interface (GUI) software 30, which is adapted to facilitate displaying one or more visualizations 28, such as analytics, via the touch screen 26. The GUI software 28 may be any software application or component, such as a spread sheet program, graphing software, and so on, that is adapted to facilitate displaying graphical user interface features and/or data, such as graphs, menu items, dialog boxes, and so on.

The example GUI software 30 includes a controller 32 in communication with a visualization generator 34, a visualization actions module 38, and a touch gesture mapping module 36. The controller 30 includes computer code for coordinating inputs and outputs to and from the modules 34-38 and interfacing the GUI software 30 and accompanying modules 34-38 with the server-side software 22.

The visualization generator 34 includes computer code for generating visualizations, such as tables, charts, graphs, and so on. The visualization actions module 38 includes computer code for implementing various visualization actions, also called manipulations, which are applied to visualizations. Example actions include pivoting, implementing logical zoom in (i.e., drilling in), logical zooming out (i.e., drilling out), filtering data, adding or removing dimensions, and so on. The touch gesture mapping module 36 includes computer code for activating functionality implemented via the visualization actions module 38 in response to touch gestures that are assigned to the actions. Hence, in general, the various GUI modules 34-38 include computer code for implementing functionality for adjusting how a visualization is displayed via the touch screen 26, i.e., for manipulating a visualization, such as by performing actions thereon.

An example of pivoting may include changing a perspective as to how data is displayed in a visualization, such as by repositioning rows or columns in a table, i.e., visualization edges, as discussed more fully below.

Zooming, also called logical zooming or drilling herein, may involve changing a level at which data is summarized. For example, switching from displaying data by region to displaying data by county may represent a type of zooming or drilling. Drilling may also involve simultaneous filtering and changing a level at which data is summarized. For example, drilling on North America may show data for each country in North America, while omitting data for other countries. This type of drilling is also simply called simultaneous drilling and filtering or simultaneous filtering and drilling.

Filtering may involve limiting displayed data by selecting what to include or selecting what to exclude from a visualization. For example, limiting visualization to only show North America region, or to show all regions but Asia, would represent a type of filtering.

Adding or removing dimensions or measures may involve adding or removing displayed facts about the data and perspectives. For example, adding a "region" dimension to a visualization may cause the visualization to display data by region, countries, provinces, and so on, as discussed more fully below.

Example mappings between touch gestures and visualization actions include rotate to pivot, pinch open or closed to zoom in or out, and drag (also called press and drag) and tap to simultaneously drill and filter. An example mapping between a sequence of touch gestures and actions includes drag, touch and hold (also called press and hold), followed by tap being mapped to a filter operation, as discussed more fully below.

In an example operative scenario, a user employs the mobile computing device 12 to browse to a website hosted by the ERP server system 14, which provides access to the server-side tree software 22 and accompanying database objects 20. The controller 30 may facilitate downloading database objects 20 from the ERP server system 14 and server-side tree software 22 for use in constructing a visualization 28 to be displayed via the touch screen 26.

In the present example operative scenario, the GUI software 30 selectively downloads database objects 20 from the ERP server system 18. The visualization generator 34 then employs client-side visualization-generating computer code to construct a visualization in accordance with instructions included in the controller 30 and input from the touch screen 26.

The touch gesture mapping module 36 then monitors touch input provided via the touch screen 26 via the controller 32 and determines which touch gesture has been applied to the touch screen 26, where on the touch screen 26 the touch gesture has been applied relative to a displayed visualization, and then triggers an action or manipulation applied to the visualization 28 based on which action the detected touch gesture has been mapped to.

Note that while the example GUI software 30 is shown included in the mobile computing device 12, implementations are not limited thereto. For example, the GUI software 30 may be incorporated into the server-side tree software 22 and run on the server 14 as a server-side application. The server side application may be run server-side and viewed client-side via a browser software running on the mobile computing device 12.

Figure 2A:
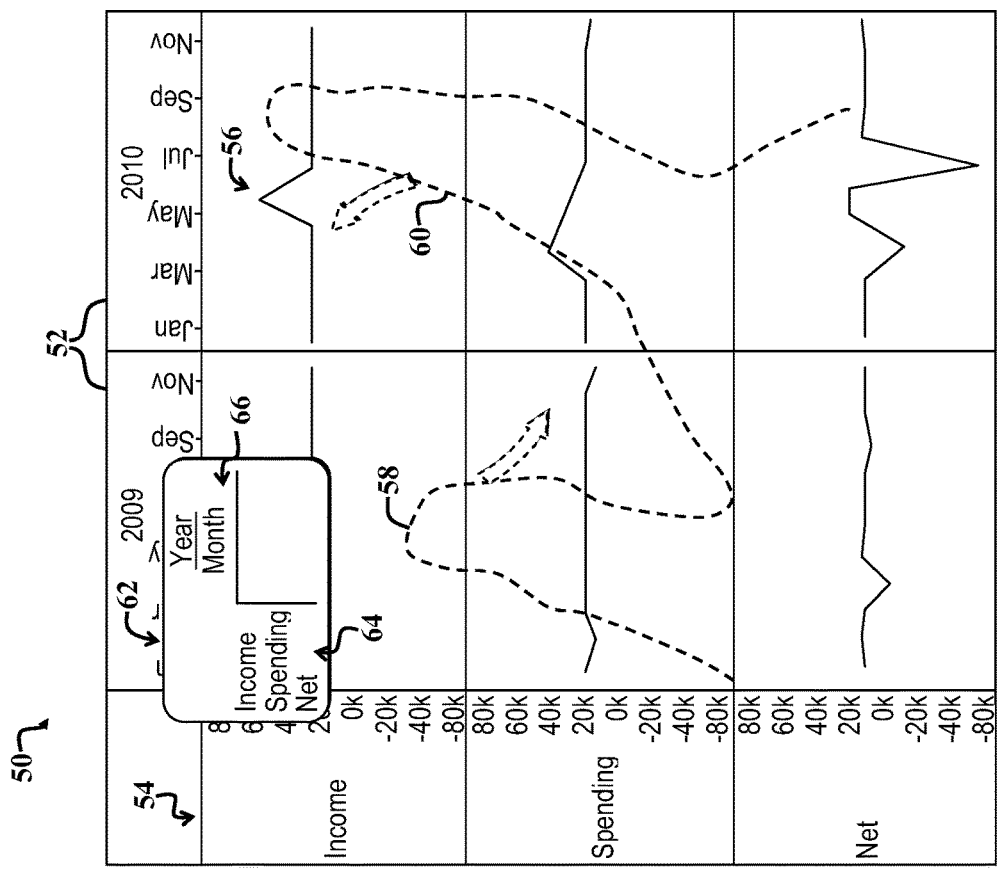
FIG. 2A is a first example user interface display screen illustrating a table visualization and a rotate-to-pivot gesture initially being applied thereto.

FIG. 2A shows a first example user interface display screen 50 illustrating a table visualization 50 and a rotate-to-pivot gesture, also simply called a rotation gesture, initially being applied thereto via a first finger 58 (e.g., thumb) and a second finger 60 (e.g., index finger).

For the purposes of the present discussion, a user interface display screen may be any software-generated depiction presented on a display, such as the touch screen 26 of FIG. 1. Examples of depictions include windows, dialog boxes, displayed tables, and any other graphical user interface features, such as user interface controls, presented to a user via software, such as a browser. User interface display screens may include various graphical depictions, including visualizations, such as graphs, charts, diagrams, tables, and so on.

A rotation gesture may be any gesture applied to a touch screen at two or more positions, such as by two or more fingers, and includes moving two or more of the positions along clockwise or counterclockwise arcs. For example, a user may press two fingers to a touch screen and rotate their wrist clockwise or counterclockwise to cause the fingers to implement a rotation gesture.

The example table 50 includes rows 54 for income, spending, and net, and columns 52 for different years, which are broken down by month. Cells of the table 50 illustrate various graphs 56, which include depictions of income, spending, and net for various years, as measured per month.

In the present example embodiment, a user presses the first finger 58 and the second finger 60 on a touch-sensitive display illustrating the visualization 50. For the purposes of the present discussion, when a user presses on a region of a display screen coinciding with a visualization, the user is said to be pressing on the visualization.

Simultaneous pressing of the two fingers 58, 60 on the visualization, i.e., table 50, causes a second visualization 62 to appear. The second visualization 62 represents an indicator for illustrating various user options for changing the arrangement of data in the table 50, i.e., for implementing a pivot operation.

Initially, the second visualization 62 illustrates the current arrangement of rows 54 and columns 52 via an income-spending-net indicator 64 and a year-over-month indicator 66. With reference to FIGS. 2A-2D, as a user implements a rotation gesture, e.g., by rotating a wrist so that the two fingers 58, 60 move in an approximately circular motion across the table 50, the second visualization 62 changes to reflect different pivot options. The different pivot options can be applied to the table 50 to trigger rearrangement of data in accordance with a displayed pivot option.

When a user releases the fingers 58, 60 from the table 50, the pivot operation indicated by the second visualization 62 is applied to the underlying table 50. Alternatively, pivot operations are applied to both the underlying table 50 and the second visualization 62 as the user continues to perform the rotation gesture.

For the purposes of the present discussion, a pivot operation may be any operation that includes exchanging positions of two or more reference areas in a visualization. A reference area may be a primary dimension, direction, node, or region in a visualization that is used to orient data objects (e.g., values, labels, icons, etc.) in the visualization for layout and viewing. For example, primary dimensions in a table can be row, column; primary dimensions in a sunburst chart can be concentric rings or levels; a primary node in a tree hierarchy can be a node about which two or more leaf nodes are oriented, etc.

For example, reference areas in a table may include rows, columns, and/or row and column directions. Reference areas in a sunburst visualization may include rings of the sunburst visualization. In a chart or graph the reference areas may be the horizontal and vertical axes. In a tree hierarchy, the reference areas may be defined by a node or axis about which the node's leaf nodes may be swapped or exchanged, and so on.

Hence, an example pivot operation applied to a table may involve rearrangement or interchange of columns or rows of a table. An example pivot operation applied to a sunburst visualization may involve changing the order of, e.g., interchanging, rings of the sunburst visualization. In a bar chart, the pivoting may involve switching the horizontal and vertical axis or switching the direction of the axis, and so on. In a tree diagram, pivoting might involve rotating or flipping sub-trees (branches) (called pivoting about a parent node); rotating or flipping the whole tree about a vertical axis; arranging the nodes based on a different hierarchal rule, and so on.

For the purposes of the present discussion, a user is said to be implementing a rotate-to-pivot, i.e., using a rotation gesture to trigger a pivot operation, to change an arrangement of data displayed in a visualization, such as by repositioning rows or columns in a table, i.e., visualization edges.

In summary, the rotate-to-pivot mapping may be activated when a user places two or more fingers on the visualization and moves them in a circular motion. Underlying software, e.g., the GUI software 30 of FIG. 1, responds by cycling through a preview 62 of possible layouts of visualization edges. When a user lifts the fingers 58, 60 when the second visualization 62 shows a user preferred layout, the visualization edges, e.g., rows 54 and columns 52, get repositioned accordingly, and visualization is re-rendered to show the arrangement illustrated in the second visualization 62.

Conventionally, a user triggers a pivot operations by defining rows and columns in a dialog box, or by dragging and dropping rows and columns between edges of a visualization. Embodiments discussed herein instead enable users to quickly cycle through multitude of possible layouts without either losing focus on the visualization or re-rendering the visualization each time a pivot option is viewed.

Figure 2B:
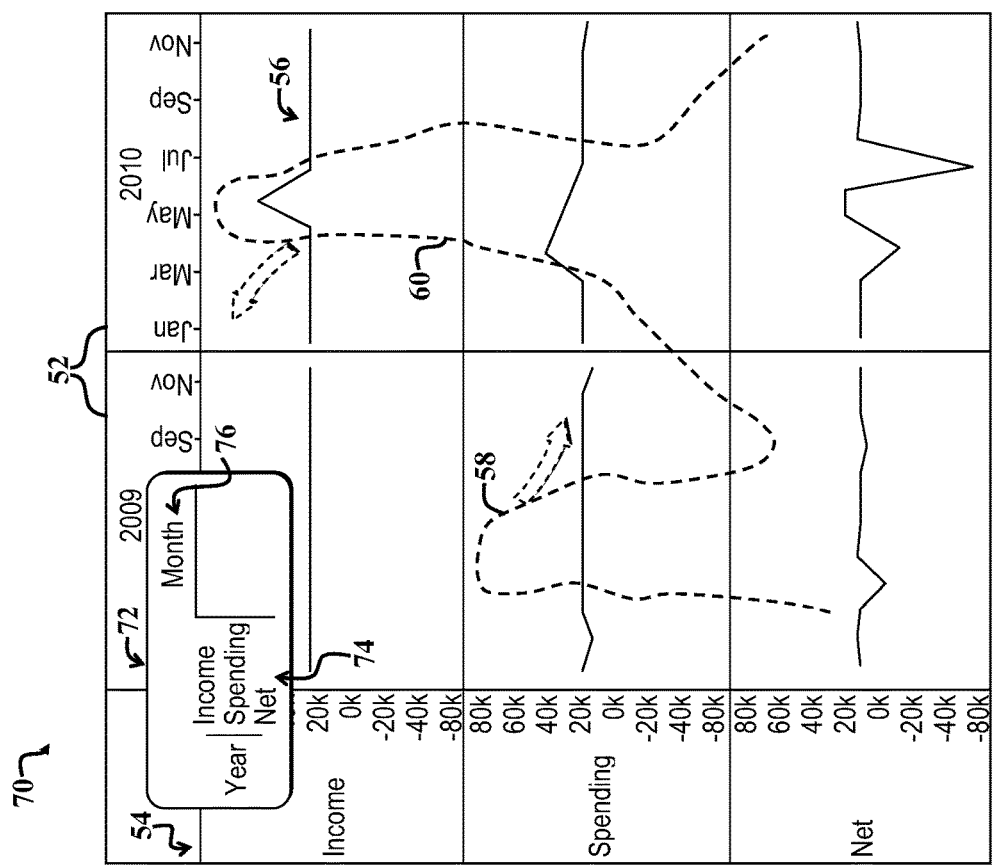
FIG. 2B illustrates a second example user interface display screen after a user has further rotated two fingers as part of the rotate-to-pivot gesture began in FIG. 2A.

FIG. 2B illustrates a second example user interface display screen 70 after a user has further rotated two fingers 58, 60 as part of the rotate-to-pivot gesture began in FIG. 2A. In FIG. 2B, an updated second visualization 72 is displayed in response to continuation of the rotation gesture.

The updated second visualization 72 includes a row indicator 74 and a column indicator 76 indicating the current user option represented by the second visualization 72 would result in arrangement of rows by year broken down by income, spending, and net, and arrangement of columns by month. To select the current pivot option indicated by the updated second visualization 72, a user releases, i.e., removes the fingers 58, 60 from the table 70 when the updated second visualization 72 is shown.

Figure 2C:
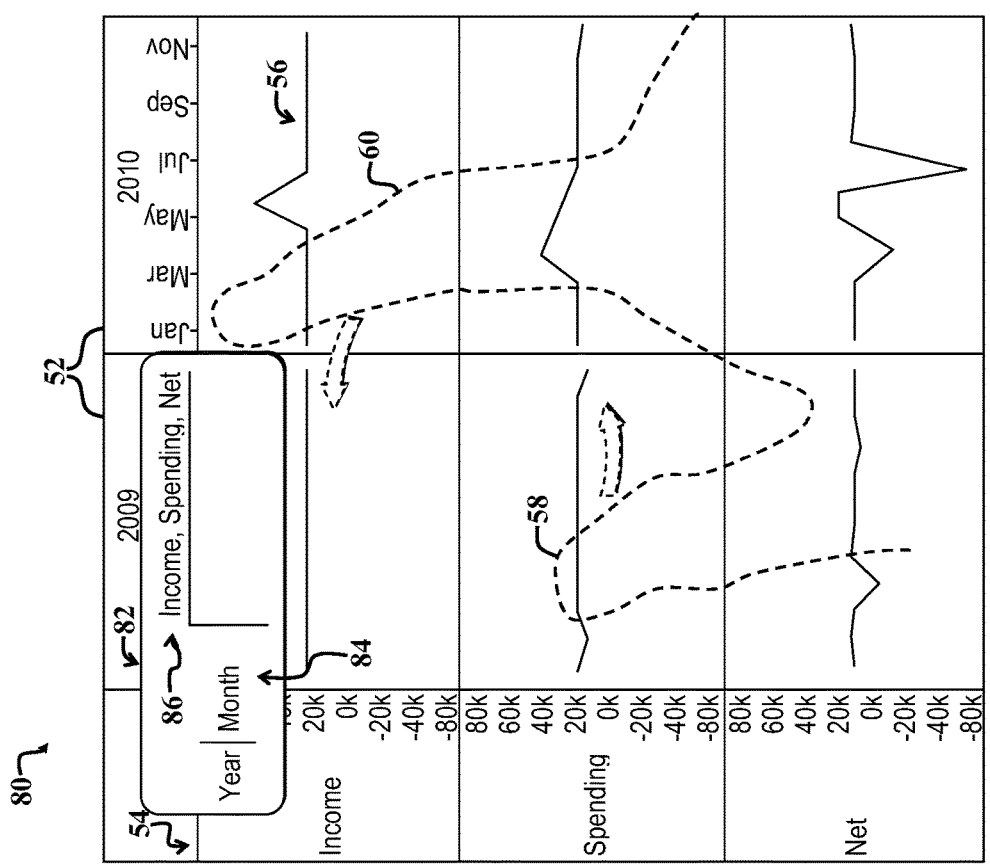
FIG. 2C illustrates a third example user interface display screen after a user has further rotated two fingers as part of the rotate-to-pivot gesture continued in FIG. 2B.

FIG. 2C illustrates a third example user interface display screen 80 after a user has further rotated two fingers 58, 60 as part of the rotate-to-pivot gesture continued in FIG. 2B. In FIG. 2C, a further updated second visualization 82 is displayed in response to continuation of the rotation gesture.

The updated second visualization 82 includes an updated row indicator 84 and an updated column indicator 86 indicating the current user option represented by the second visualization 82 would result in arrangement of rows by year broken down by month, and arrangement of columns by income, spending, and net. To select the current user option indicated by the updated second visualization 82, a user releases, i.e., removes the fingers 58, 60 from the table 80 when the updated second visualization 82 is shown.

Figure 2D:
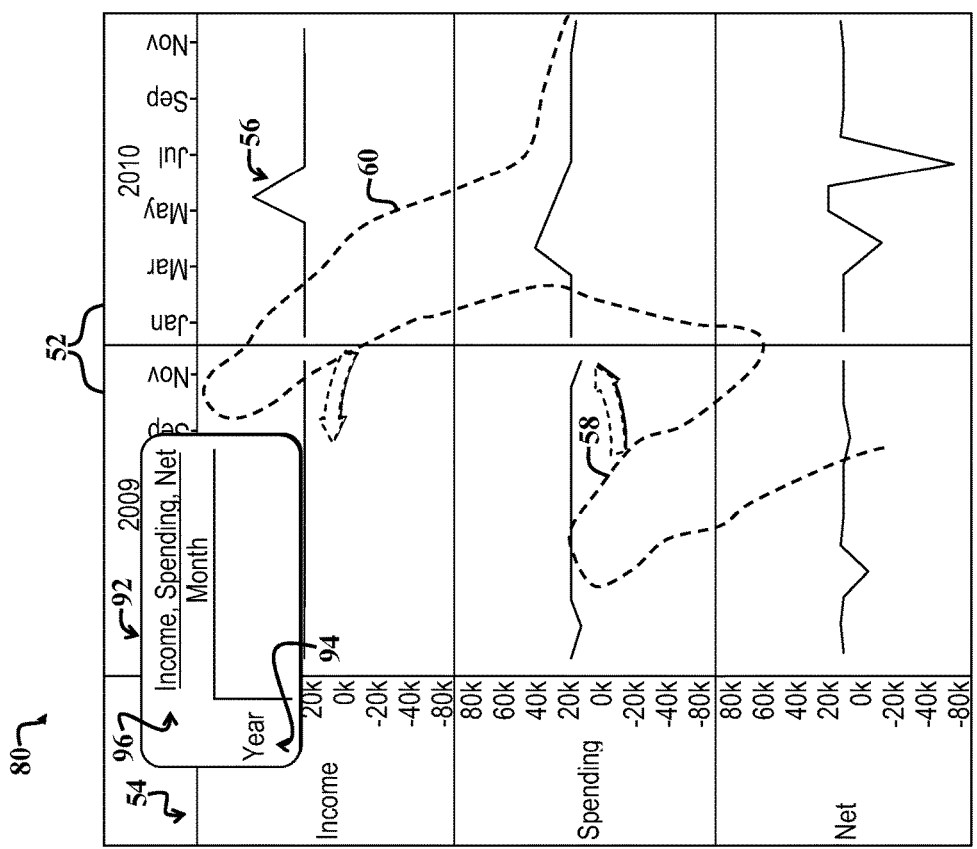
FIG. 2D illustrates a fourth example user interface display screen after a user has further rotated two fingers as part of the rotate-to-pivot gesture continued in FIG. 2C.

FIG. 2D illustrates a fourth example user interface display screen after a user has further rotated two fingers as part of the rotate-to-pivot gesture continued in FIG. 2C. In FIG. 2D, a further updated second visualization 92 is displayed in response to continuation of the rotation gesture.

The further updated second visualization 92 includes an updated row indicator 94 and an updated column indicator 96 indicating the current user option represented by the second visualization 92 would result in arrangement of rows by year, and arrangement of columns by income, spending, and net broken down by month. To select the current user option indicated by the further updated second visualization 92, a user releases, i.e., removes the fingers 58, 60 from the table 90 when the updated second visualization 92 is shown.

Note that while the rotate-to-pivot, i.e., the rotation gesture, being implemented in FIGS. 2A-2D is illustrated as a counterclockwise rotation, that embodiments are not limited thereto. For example, the fingers 58, 60 may be moved in a clockwise rotation, without departing from the scope of the present teachings.

Furthermore, note that the pivot options represented by the second visualizations 62, 72, 82, 92 are illustrative and may include additional, fewer, or different pivot options, without departing from the scope of the present teachings. For example, another pivot option may include arranging the table visualization 70 with rows for income, spending, and net, and with columns by year, but not broken down by month.

In addition, certain embodiments may eliminate display of the second visualizations 62, 72, 82, 92 and apply pivot operations directly to the underlying tables 50, 70, 80, 90 as a rotation gesture is implemented, without departing from the scope of the present teachings.

Figure 3A:
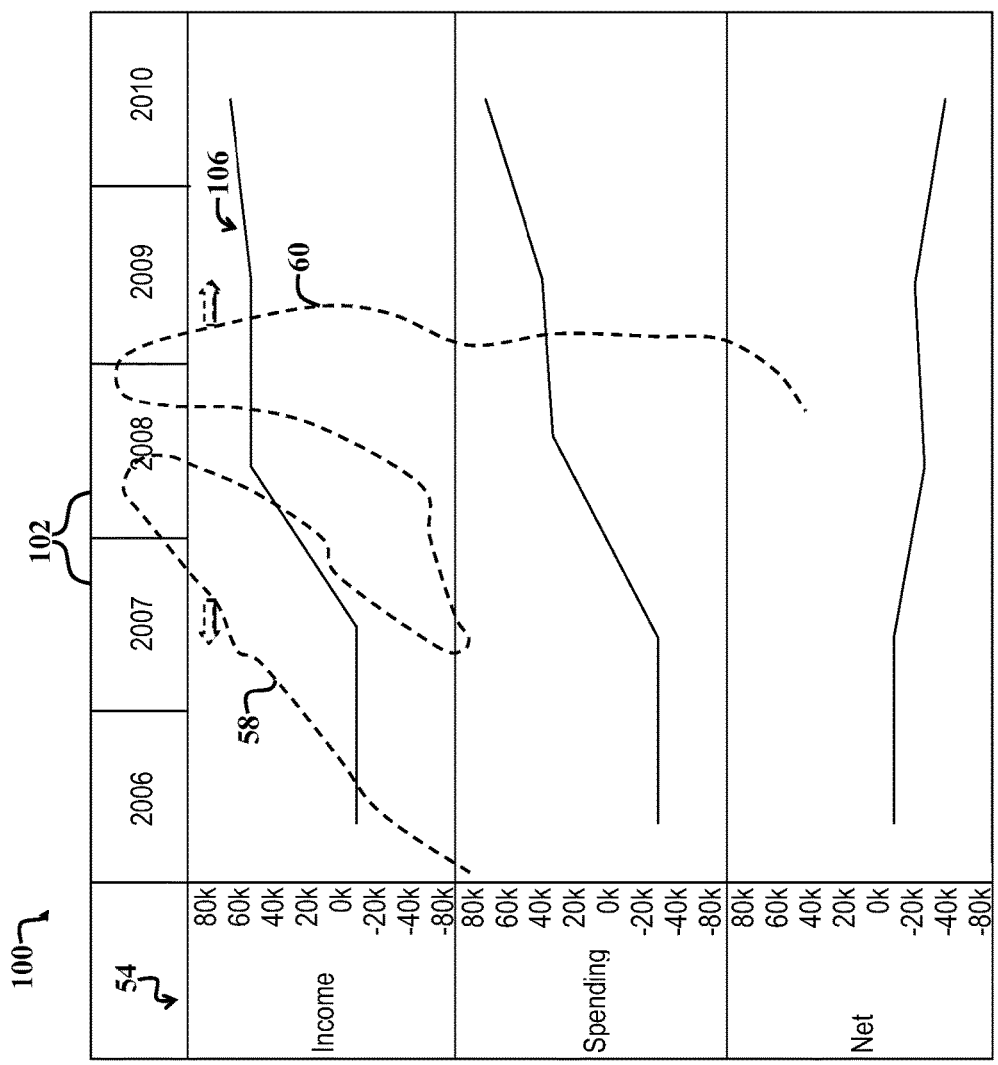
FIG. 3A illustrates a fifth example user interface display screen after a user has selected a pivot option of FIG. 2A and is initially applying a pinch apart gesture to implement drilling operation (logical zoom) on a time dimension of a table visualization.

FIG. 3A illustrates a fifth example user interface display screen 100, representing a table visualization 100, after a user has selected a pivot option of FIG. 2A and during initial application of a pinch apart gesture to implement drilling operation (logical zoom) on a time dimension 102 of the table visualization 100. In the present example embodiment, the time dimension 102 corresponds to columns by year. Displayed graphs 106 include graphs for income, spending, and net, with data points taken for each year represented by a column 102.

A drilling operation applied to a visualization or implemented on data displayed via a visualization, may be any operation that causes additional data represented by an object depicted via the visualization to be displayed. For example, if an object, such as a table row depicting sales by year is drilled in, the row depicting sales by year may then further illustrate sales by month for each year. Such a drilling operation is also called a logical zoom in.

Similarly, a drilling out operation may involve displaying more generalized data and hiding more specific data pertaining to an object displayed by or represented in the visualization. For example, if a visualization illustrates sales by city, a drilling out operation might illustrate summarized data pertaining to sales by state. Such an operation is said to implement a logical zoom-out operation, also simply called a zoom out operation herein.

For the purposes of the present discussion, a pinch gesture may involve contacting a touch-sensitive display at two or more positions, e.g., via two fingers, and moving the positions closer together or further apart. When a user touches a touch-sensitive display with two fingers and moves the two fingers closer together while touching the display with the two fingers, the gesture is called a pinch together gesture or a pinch close gesture. Similarly, when a user separates two fingers further apart while touching a display with the two fingers, the gesture is called a pinch apart gesture or a pinch open gesture.

Figure 3B:
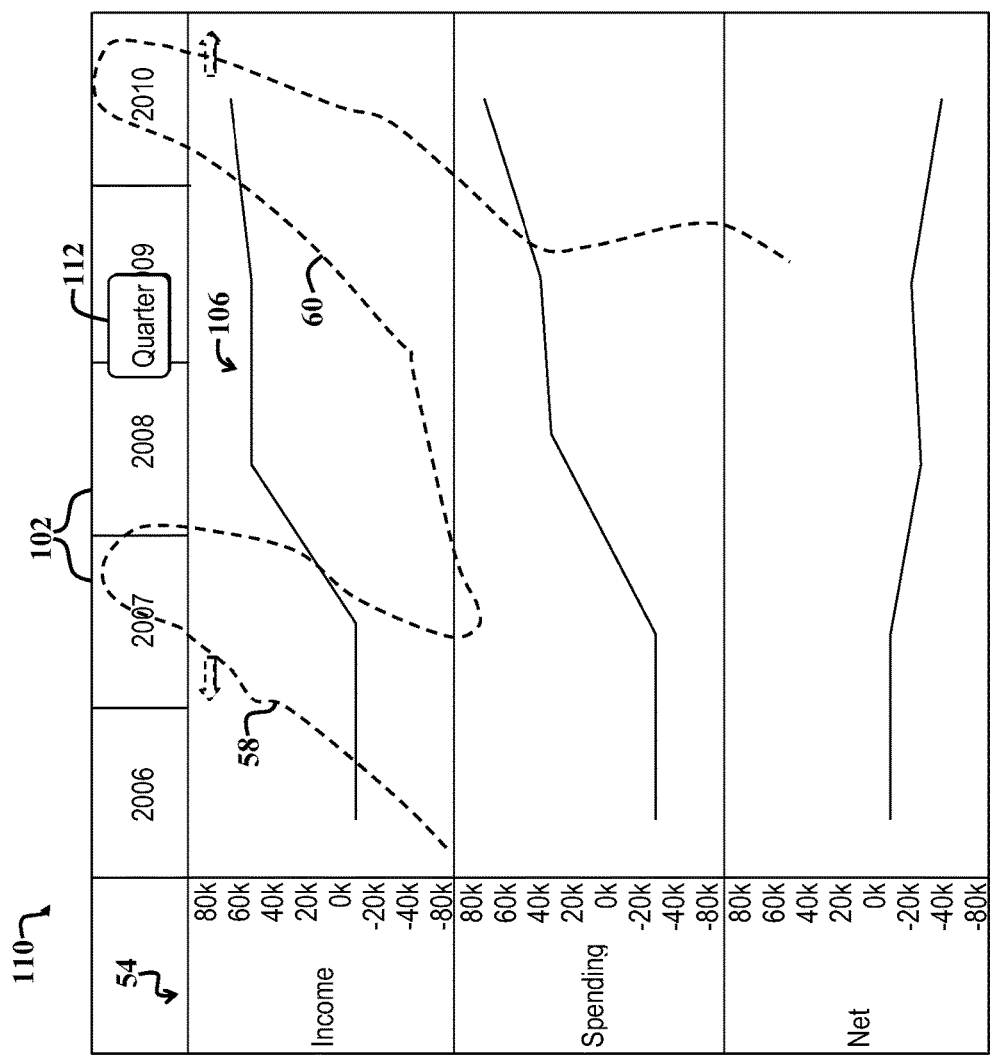
FIG. 3B illustrates a sixth example user interface display screen after a user has further separated their fingers as part of the pinch apart gesture began in FIG. 3A.

In the present example embodiment, a user is implementing a pinch apart gesture by contacting the time dimension 102 and moving the fingers 58, 60 further apart. Such a pinch apart gesture is also called a pinch-open-to-zoom-in gesture herein. With reference to FIG. 3B, in response to this gesture, an indicator box 112 may appear. The indicator box 112 represents a user option to select a drill or zoom level for the selected time dimension 102.

FIG. 3B illustrates a sixth example user interface display screen 110 after a user has further separated their fingers 58, 60 as part of the pinch apart gesture began in FIG. 3A. The indicator box 112 illustrates "quarter," such that if a user releases the fingers 58, 60 from the visualization 110 when the indicator box 112 is shown, the time dimension 102 will be adjusted to show years broken down by quarter.

Figure 3C:
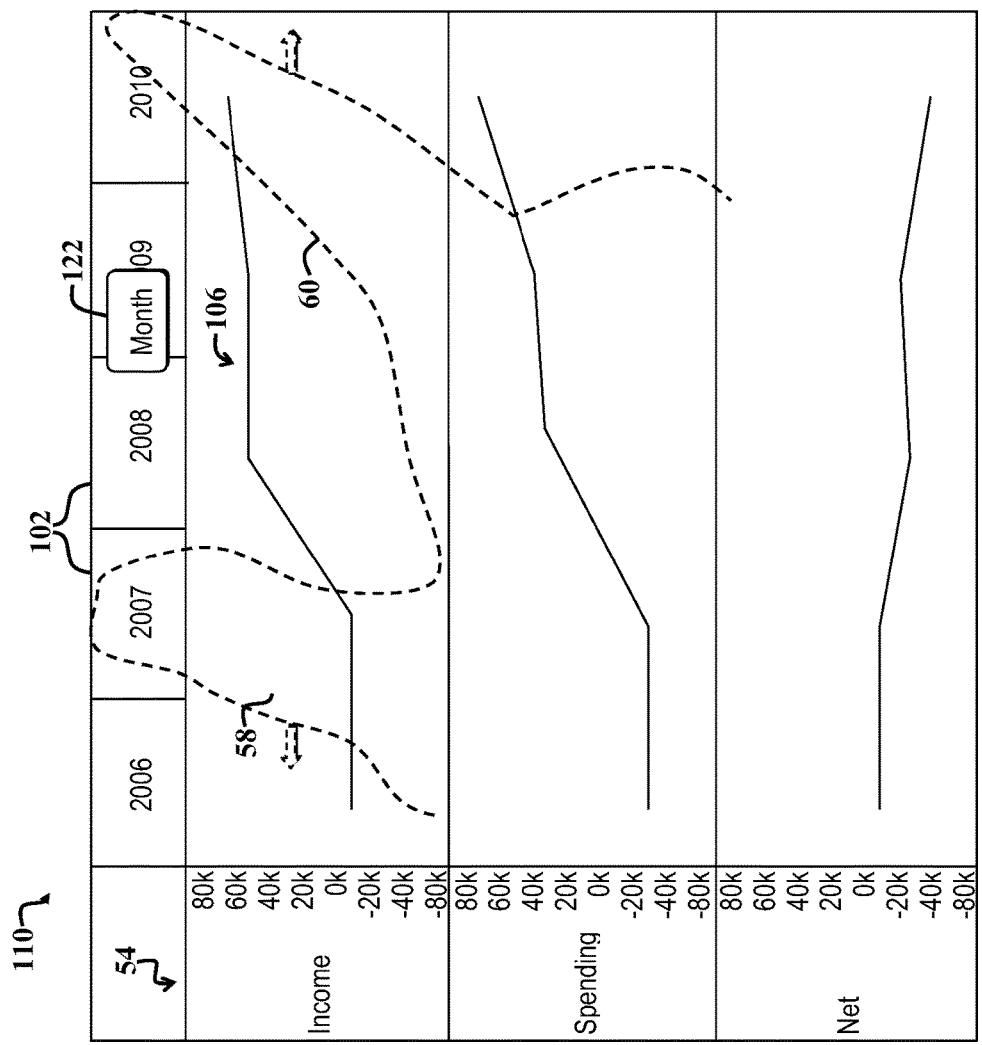
FIG. 3C illustrates a seventh example user interface display screen after a user has further separated their fingers as part of the pinch apart gesture continued in FIG. 3B.

FIG. 3C illustrates a seventh example user interface display screen 110 after a user has further separated their fingers 58, 60 as part of the pinch apart gesture continued in FIG. 3B. Further separating the fingers 58, 60 results in display of an updated indicator box 122.

The updated indicator box 122 illustrates "month," such that if a user releases the fingers 58, 60 from the visualization 110 when the indicator box 122 is shown, the time dimension 102 will be further adjusted to show years broken down by month. Upon release of the fingers 58, 60, when the time dimension 102 is broken down by month, the underlying table 120 may look similar to the table 80 of FIG. 2D.

Note that user options represented by the indicator boxes 112, 122 are merely illustrative and may be augmented or changed, without departing from the scope of the present teachings. For example, continued separation of the fingers 58, 60 may result in an additional option to drill down to week, day, or smaller time interval.

Furthermore, the indicator boxes 112, 122 may be omitted, and changes may be applied directly to the underlying tables 110, 120 as the user implements a pinch gesture, without departing from the scope of the present teachings.

In addition, while a visualization manipulation responsive to a pinch apart gesture is illustrated herein, other pinching gestures may be employed to drill in or out on a dimension or measure. For example, a pinch close, i.e., a pinch together gesture, may be employed to, for example, adjust a time dimension that illustrates years broken down by month, so that it only includes columns illustrating data broken down by year.

Hence, a pinch open/close gesture may be employed to zoom in/out on a dimension. The pinch open/close gesture involves a user placing two fingers 58, 60 on a visualization edge, such as the time dimension 102, and either spreading fingers apart or drawing them together to change the level data is summarized.

Conventionally, pinch open/close gestures might affect a physical size of a visualization. However, embodiments discussed herein may provide enhanced functionality by enabling simultaneous adjustments to both the size of a displayed element and adjustments to the amount of data summarized by each element.

Figure 4A:
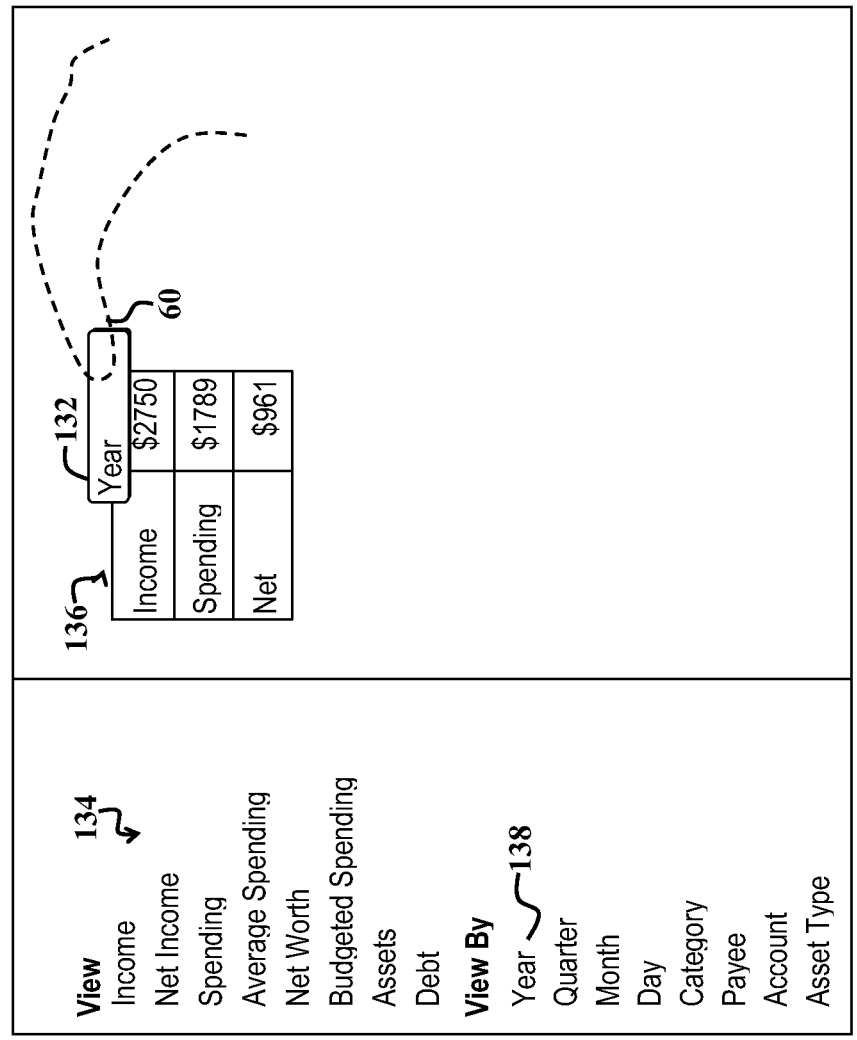
FIG. 4A illustrates a ninth example user interface display screen and a press and drag gesture being applied to a table visualization to add a dimension thereto.

FIG. 4A illustrates a ninth example user interface display screen 130 and a press and drag gesture being applied to a table visualization 136 to add a dimension thereto. The user interface display screen 130 includes a pallet 134 with indications of various dimensions, including a year dimension 138, which may be selected and dragged from the pallet 134 to the visualization 136. For example, a user may employ the finger 60 to press the year dimension indicator 138 in the pallet 134 and then drag the finger across the display screen 130 to a desired position in the visualization 136.

When a user has selected the year dimension indicator 138 by pressing and dragging, a resulting year button 132 is illustrated. The year button 132 moves along with the finger 60 across the user interface display screen 130 as the user drags the finger 60 across the user interface display screen 130. In FIG. 4A, the user is said to be implementing a press and drag gesture, also simply called a drag gesture, to add a dimension to the visualization 136.

FIG. 4B illustrates a tenth example user interface display screen 140 after a user has further dragged a dimension, represented by the year button 132, into position via the press and drag gesture began in FIG. 4A.

Positioning the year button 132 in the visualization 136 in FIG. 4A results in an updated visualization 146 shown in FIG. 4B. The updated visualization 146 then includes a newly added set of columns broken down by year and representing an added year dimension 142.

Note that one or more dimensions of the table 146 may be removed by pressing on a column or row header, i.e., visualization edge, and the employing a drag gesture to drag the resulting selection off of the user interface display screen 140.

Figure 5A:
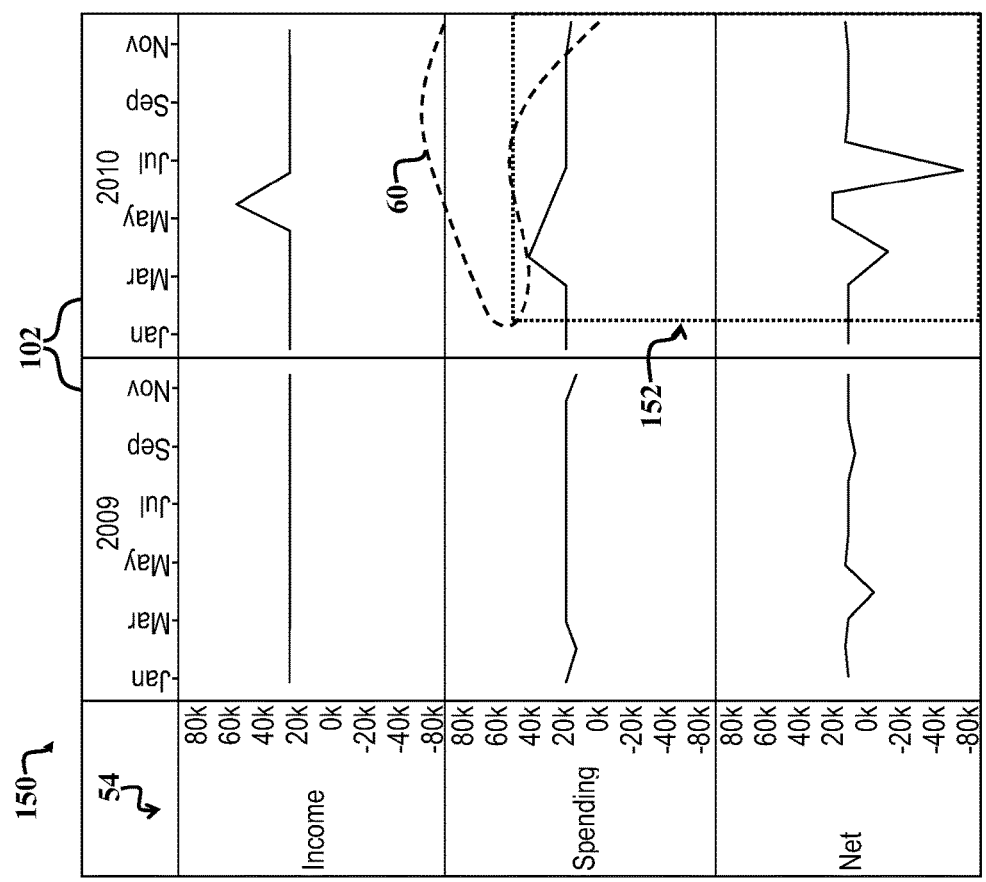
FIG. 5A illustrates an eleventh example user interface display screen after a user has begun selecting a region of a table via a press and drag gesture.

FIG. 5A illustrates an eleventh example user interface display screen 150, representing a table visualization 150 (i.e., table), after a user has begun selecting a region 152 of the table 150 via a press and drag gesture via the index finger 60. The table 150 includes rows 154 arranged by income, spending, and net, and columns 102 arranged by year broken down by month. Page: 20

Figure 5B:
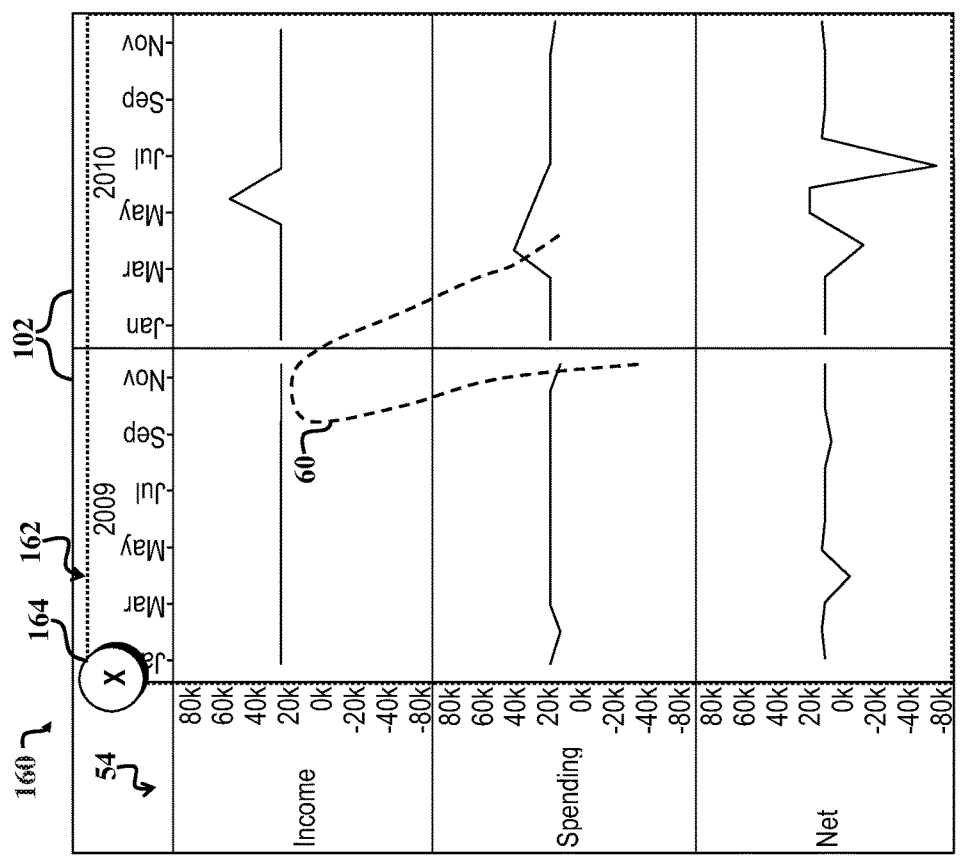
FIG. 5B illustrates a twelfth example user interface display screen after a user has finished selecting a region and has implemented a press and hold gesture to trigger display of a user interface control to facilitate filtering data in a table based on the selection.

FIG. 5B illustrates a twelfth example user interface display screen, representing a table 160, after a user has finished selecting a region 162 and has implemented a press and hold gesture to trigger display of a user interface control 164 to facilitate filtering data in the table 160 based on the selection.

For the purposes of the present discussion, user interface control, such as the control 164, may be any displayed element or component of a user interface display screen, which is adapted to enable a user to provide input, view data, and/or otherwise interact with a user interface. Additional examples of user interface controls include buttons, drop down menus, menu items, and so on. Similarly, a user interface control signal may be any signal that is provided as input for software, wherein the input affects a user interface display screen and/or accompanying software application associated with the software.

After the region 162 is selected, the user presses and holds the finger 60 on the region 162 until the user interface control 164 is shown. In the present example embodiment, the user interface control 164 represents a user option to remove data and any accompanying dimensions pertaining to the selected region 162 from the table 160. The selected data corresponding to the region 162 is said to be filtered from the table 160.

Hence, the user employs a sequence of gestures, which may be considered a single combined gesture that involves sub-gestures. The combined gesture may be called a drag, press and hold, and tap gesture, where the final tap is applied to the displayed user interface control 164.

For the purposes of the present discussion, a filtering operation, such as may be applied to a visualization, such as the table 160, may be any operation that causes less or more data to be displayed in accordance with a filtering criterion or criteria. A filtering criterion or criteria may be any condition applied to data to determine whether the data fits the criterion or not. A visualization is said to be filtered if data displayed thereby or therein is adjusted based on a criterion or criteria. The criterion or criteria is called a filtering criterion or criteria.

For example, in a visualization that displays data pertaining to population of the United States, a filtering criterion may specify that only data pertaining to California be displayed. In the present example embodiment, the filtering criterion is set by the contents of the selected region 162. Page: 21

Figure 6:
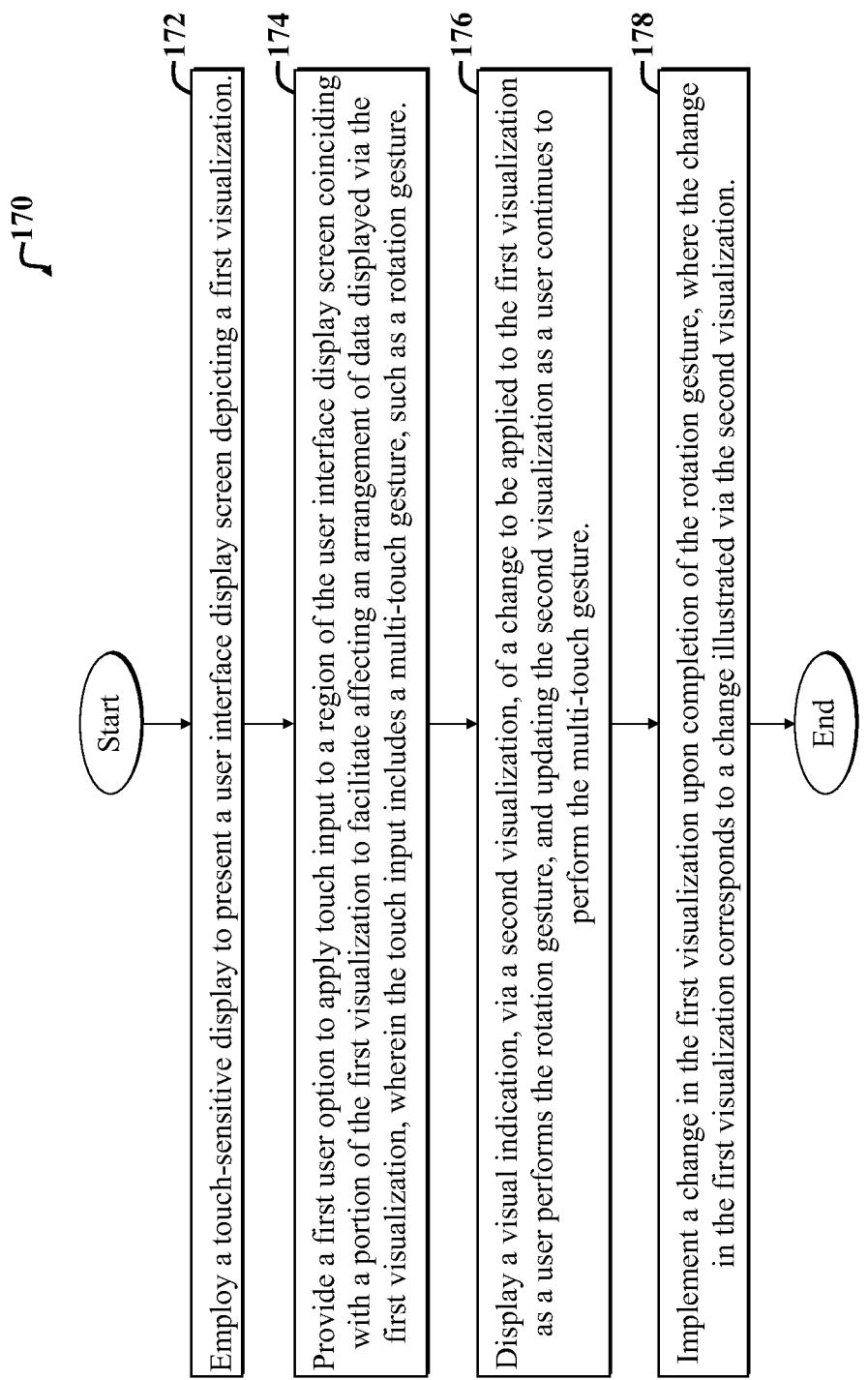
FIG. 6 is a flow diagram of an example method adapted for use with the embodiments of FIGS. 1-5B.

FIG. 6 is a flow diagram of an example method 170 adapted for use with the embodiments of FIGS. 1-4B. The example method 170 is adapted to facilitating adjusting a displayed representation of a visualization and includes a first step 172, which involves employing a touch-sensitive display to present a user interface display screen depicting a first visualization.

A second step 174 includes providing a first user option to apply touch input to a region of the user interface display screen coinciding with a portion of the first visualization to facilitate affecting an arrangement of data displayed via the first visualization. The touch input includes a multi-touch gesture, such as a rotation gesture.

A third step 176 includes displaying a visual indication, via a second visualization, of a change to be applied to the first visualization as a user performs the rotation gesture, and updating the second visualization as a user continues to perform the rotation gesture.

A fourth step 178 includes implementing a change in the first visualization upon completion of the rotation gesture, where the change in the first visualization corresponds to a change illustrated via the second visualization.

Hence, certain embodiments discussed herein may be employed as part of a complete semantic of specialized gesture-based analytic manipulations, thereby enabling users to efficiently manipulate analytic visualizations with minimal effort.

Conventionally, touch gestures and accompanying methods were generic, such that the gestures and methods are the same between analytic and any other application. For example, conventionally, pinching out might increase the size of visualization, which may be meaningless for data analysis.

Although the description has been described with respect to particular embodiments thereof, these particular embodiments are merely illustrative, and not restrictive. For example, while touch gestures are shown being implemented via fingers, embodiments are not limited thereto, for example certain gestures may be implemented with a stylus or other device, without departing from the scope of the present teachings.

Furthermore, while the present application is discussed with respect to systems and methods for employing context-sensitive gestures to control enterprise web-based analytic applications via a mobile device with a touch-sensitive display, embodiments are not limited thereto. For example, use of certain intuitive gestures and accompanying methods for determining the context of a user interface display screen to thereby adjust functionality associated with a touch gesture, as discussed herein, may be employed in applications other than web-based applications. Furthermore, certain methods discussed herein may be extended generally to implementations for facilitating enabling touch-control inputs for various analytic software applications, which might employ visualization other than tables as discussed herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for adjusting a visualization displayed on a touch-sensitive display screen, the method comprising:
    presenting a first layout of a first visualization on the touch-sensitive display screen, wherein the first layout of the first visualization includes a first arrangement of one or more visualization edges and one or more analytic indicators corresponding to the one or more visualization edges;
    detecting a multi-touch rotation gesture that comprises contact with the touch-sensitive display screen simultaneously at different positions on the touch-sensitive display screen;
    displaying, in a second visualization, over at least a portion of the first visualization, a preview of the first layout of the first visualization, wherein the second visualization provides only one version of the first layout with respect to a rotational position of the multi-touch rotation gesture relative to a starting rotational position of the multi-touch rotation gesture;
    detecting a rotation of the multi-touch rotation gesture;
    while holding the first visualization in a static state, generating a second layout of the first visualization with respect to a particular rotational position of the multi-touch rotation gesture, wherein the second layout of the first visualization includes a second arrangement of the one or more visualization edges and the one or more analytic indicators representing one or more changes to the first visualization when selected, wherein the second layout is configured to present in the preview at least a portion of the first visualization incorporating changes to the first visualization in response to the rotational position of the multi-touch rotation gesture;
    illustrating the one or more changes in the preview by displaying, in the preview, one or more different visualization edges and the one or more analytic indicators that are based on the second layout;
    in response to detecting subsequent rotations of the multi-touch rotation gesture updating the second visualization to additional preview changes of the arrangement of the one or more visualization edges and the one or more analytic indicators representing one or more changes to the first visualization wherein the rotational position changes result in a cycling through a plurality of the preview changes;
    detecting completion of the multi-touch rotation gesture by detecting a lifting of contact from the touch-sensitive display screen; and
    in response to detecting the completion, implementing, in the first visualization, the one or more changes illustrated in the preview.

2. The method of claim 1, wherein the touch-sensitive display screen is a mobile touch-sensitive display screen.

3. The method of claim 1, wherein the first visualization is of a data arrangement that includes a table.

4. The method of claim 1, monitoring rotational positions of the multi-touch rotation gesture; and generating a plurality of possible layouts of the one or more different visualization edges and the one or more analytic indicators in the preview based on the monitored rotational positions with respect to an initial rotational position of the multi-touch rotational gesture.

5. The method of claim 1, receiving a signal from a user input device in response to a user option to apply touch input from the multi-touch rotation gesture to an area of the touch-sensitive display screen coinciding with a portion of the first visualization to apply an operation to the first visualization, wherein the operation is selected from a filtering operation, a pivot operation, a drilling operation, or a zoom operation; and wherein the displaying of the preview is performed in response to detecting the touch input.

6. The method of claim 1, wherein the generating of the second layout is performed in response to the particular rotational position of the multi-touch rotation gesture.

7. The method of claim 1, wherein the second layout and the one or more different visualization edges are defined by column or row headers.

8. The method of claim 1, wherein the one or more changes are one or more changes to be applied to the first visualization upon the completion of the multi-touch rotation gesture.

9. The method of claim 1, wherein the illustrating is performed while maintaining a display of the first visualization on the touch-sensitive display screen.

10. A tangible non-transitory storage medium including instructions executable by a digital processor, the tangible non-transitory storage medium comprising one or more instructions for:
    presenting a first layout of a first visualization on the touch-sensitive display screen, wherein the first layout of the first visualization includes a first arrangement of one or more visualization edges and one or more analytic indicators corresponding to the one or more visualization edges;

detecting a multi-touch rotation gesture that comprises contact with the touch-sensitive display screen simultaneously at different positions on the touch-sensitive display screen;

displaying, in a second visualization, over at least a portion of the first visualization, a preview of the first layout of the first visualization, wherein the second visualization provides only one version of the first layout with respect to a rotational position of the multi-touch rotation gesture relative to a starting rotational position of the multi-touch rotation gesture;

detecting a rotation of the multi-touch rotation gesture;

while holding the first visualization in a static state, generating a second layout of the first visualization with respect to a particular rotational position of the multi-touch rotation gesture, wherein the second layout of the first visualization includes a second arrangement of the one or more visualization edges and the one or more analytic indicators representing one or more changes to the first visualization when selected, wherein the second layout is configured to present in the preview at least a portion of the first visualization incorporating changes to the first visualization in response to the rotational position of the multi-touch rotation gesture;

illustrating the one or more changes in the preview by displaying, in the preview, one or more different visualization edges and the one or more analytic indicators that are based on the second layout;

in response to detecting subsequent rotations of the multi-touch rotation gesture updating the second visualization to additional preview changes of the arrangement of the one or more visualization edges and the one or more analytic indicators representing one or more changes to the first visualization wherein the rotational position changes result in a cycling through a plurality of the preview changes;

detecting completion of the multi-touch rotation gesture by detecting a lifting of contact from the touch-sensitive display screen; and in response to detecting the completion, implementing, in the first visualization, the one or more changes illustrated in the preview.

11. The storage medium of claim 10, wherein the touch-sensitive display screen is a mobile touch-sensitive display screen.

12. The storage medium of claim 10, wherein the first visualization is of a data arrangement that includes a table.

13. The storage medium of claim 10, further comprising: monitoring rotational positions of the multi-touch rotation gesture; and generating a plurality of possible layouts of the one or more different visualization edges and one or more analytic indicators in the preview based on the monitored rotational positions with respect to an initial rotational position of the multi-touch rotation gesture.

14. The storage medium of claim 10, further comprising: receiving a signal from a user input device in response to a user option to apply touch input from the multi-touch rotation gesture to an area of the touch-sensitive display screen coinciding with a portion of the first visualization to apply an operation to the first visualization, wherein the operation is selected from a filtering operation, a pivot operation, a drilling operation, or a zoom operation; and wherein the displaying of the preview is performed in response to detecting the touch input.

15. The storage medium of claim 10, wherein the generating of the second layout is performed in response to the particular rotational position of the multi-touch rotation gesture.

16. The storage medium of claim 10, wherein the second layout and the one or more different visualization edges are defined by column or row headers.

17. The storage medium of claim 10, wherein the one or more changes are one or more changes to be applied to the first visualization upon the completion of the multi-touch rotation gesture.

18. The storage medium of claim 10, wherein the illustrating is performed while maintaining a display of the first visualization on the touch-sensitive display screen.

* * * * *

UNITED STATES PATENT AND TRADEMARK OFFICE
CERTIFICATE OF CORRECTION

PATENT NO. : 10,430,055 B2
APPLICATION NO. : 14/840283
DATED : October 1, 2019
INVENTOR(S) : Blyumen Page 1 of 1

It is certified that error appears in the above-identified patent and that said Letters Patent is hereby corrected as shown below:

On the Title Page

Column 2, item (57) under Abstract, Line 15, after "continues" insert -- to --.

In the Specification

In Column 4, Line 42, delete "20" and insert -- 20. --, therefor.

In Column 11, Line 17, after "month." delete "Page: 20".

In Column 11, Line 63, after "162." delete "Page: 21".

In the Claims

In Column 14, Line 29, in Claim 4, before "monitoring" insert -- further comprising: --.

In Column 14, Line 36, in Claim 5, before "receiving" insert -- further comprising: --.

In Column 14, Line 62, in Claim 10, delete "the" and insert -- a --, therefor.

Signed and Sealed this
Eighth Day of September, 2020

Andrei Iancu
*Director of the United States Patent and Trademark Office*